United States Patent [19]

Geelhaar et al.

[11] 4,267,091

[45] May 12, 1981

[54] BINDERS FOR PAINTS

[75] Inventors: Hans J. Geelhaar, Frankenthal; Erich Penzel, Ludwigshafen; Gregor Ley, Wattenheim, all of Fed. Rep. of Germany

[73] Assignee: BASF Aktiengesellschaft, Fed. Rep. of Germany

[21] Appl. No.: 30,928

[22] Filed: Apr. 17, 1979

[30] Foreign Application Priority Data

Apr. 29, 1978 [DE] Fed. Rep. of Germany ....... 2819092

[51] Int. Cl.$^3$ .............................................. C08K 5/17
[52] U.S. Cl. ............................ 260/29.6 TA; 526/315; 526/316
[58] Field of Search ................. 260/29.6 TA, 29.6 M, 260/29.6 N, 29.6 MN; 526/51, 315, 316

[56] References Cited

U.S. PATENT DOCUMENTS

| | | | |
|---|---|---|---|
| 3,051,685 | 8/1962 | Slocombe | 526/316 |
| 3,317,370 | 5/1967 | Kekish | 260/29.6 TA |
| 3,345,336 | 10/1967 | Kuhlkamp | 525/329 |
| 3,597,381 | 8/1971 | Ripley | 260/29.6 HN |
| 3,896,085 | 7/1975 | Larsson | 260/29.6 TA |

*Primary Examiner*—Paul R. Michl
*Attorney, Agent, or Firm*—Keil & Witherspoon

[57] ABSTRACT

Binders which comprise (A) an aqueous emulsion of a copolymer A, having a glass transition temperature of 0–50° C., of monoolefinically unsaturated carboxylic acid esters, with or without styrene, vinyl acetate, vinyl chloride and acrylonitrile, which copolymer contains, as copolymerized units, small amounts of monoolefinically unsaturated monocarboxylic acids and/or dicarboxylic acids and/or their amides (of which the nitrogen atoms may or may not be alkyl-substituted and/or alkylol-substituted) and small amounts of monomers containing carbonyl groups, (B) from 0.05 to 1 mole, per mole of carbonyl groups present in the copolymer A, of a water-soluble aliphatic dihydrazine compound and (C) from 0 to 0.02 mole, per mole of dihydrazine compound, of a water-soluble zinc, manganese, cobalt and/or lead salt, or particularly suitable for use in paints and pebble dash renderings, since they give films which adhere particularly well to alkyd resin primers and which show particularly little tendency to whitening.

5 Claims, No Drawings

BINDERS FOR PAINTS

The present invention relates to binders for paints and pebble dash renderings, with which paints and pebble dash renderings having a greatly reduced tendency to turn white can be produced.

Clear polymer films which are produced, usually at film-forming temperatures of 5°–25° C., from polymer emulsions employed as binders for paints, become opaque on storage in water. This is referred to as whitening of the polymer film. Depending on the nature of the polymer film and on the temperature, this whitening may take place after merely a few seconds or only after several days storage of the film in water. The whitening also depends on the temperature at which the polymer film has been formed, on the particle size of the polymer particles and on the particle size distribution of the polymer emulsion and is reversible, ie. on drying the film the opaque appearance in most cases disappears completely. Whitening can be very objectionable, particularly in the case of colored paints of high binder content, and in the case of synthetic resin-bonded plasters, especially pebble dash renderings, since it causes a change in the hue of the paint films when moistened, for example by rain. This color change resulting from whitening on exposure to moisture is particularly pronounced in the first few weeks after the paint films or coatings have been applied.

It is true that the rate at which whitening occurs can be reduced by using relatively fine polymer emulsions, but is is not possible by these means to prevent, or significantly reduce, the opaque appearance which ultimately manifests itself. For example, a colored coating based on a coarse emulsion shows a substantial change in hue after merely a few hours exposure to rain, whilst a corresponding coating produced using a fine polymer emulsion as the binder only shows a similar change of hue after about one day.

Whitening occurs with the conventional polymer emulsions which are employed as binders for paints and pebble dash renderings and which contain polymers which have glass transition temperatures of 0°–50° C. and are derived from the monomers conventionally used for this purpose. For example, such copolymers may essentially be derived from mixtures of MMA or styrene and n-butyl acrylate, from vinyl acetate and n-butyl acrylate or from vinyl chloride and vinyl propionate, or from styrene and butadiene, and may contain, as copolymerized units, small amounts, for example from 1 to 8% by weight, of monomers having reactive groups, for example acrylic acid, methacrylic acid and their amides N-methylolacrylamide, N-methylolmethacrylamide, maleic anhydride, maleic acid, N-methylacrylamide, β-hydroxypropyl acrylate and β-hydroxypropyl methacrylate, as well as up to 20% of acrylonitrile and/or methacrylonitrile.

We have found that binders for paints and pebble dash renderings, which comprise (A)

(A) an aqueous emulsion, of from 20 to 70% strength, of a copolymer A, having a glass transition temperature of 0°–50° C., of
  (a) methyl methacrylate, styrene, vinyl acetate, tert.-butyl acrylate and/or vinyl chloride, with or without acrylonitrile and
  (b) alkyl methacrylates, where alkyl is of 2 to 8 carbon atoms, alkyl acrylates, where alkyl is of 2 to 8 carbon atoms, and/or vinyl propionate, which additionally contains, as copolymerized units,
  (c) from 0.5 to 10%, of its weight, of monoolefinically unsaturated monocarboxylic acids and/or dicarboxylic acids of 3 to 5 carbon atoms and/or their amides which may or may not be substituted at the nitrogen by alkyl and/or alkylol of 1 to 4 carbon atoms, and
  (d) from 0.5 to 10%, of its weight, of monomers containing carbonyl groups,
(B) from 0.05 to 1 mole, per mole of carbonyl groups present in the copolymer A, of a water-soluble aliphatic dihydrazine compound and
(C) from 0 to 0.2 mole, per mole of dihydrazine compound; of a water-soluble salt of a metal from the group comprising zinc, manganese, cobalt and lead, give films which exhibit a very greatly reduced tendency to turn white. Furthermore, such films exhibit adhesion to alkyd resin primers which is at least a hundred times greater than the adhesion of conventional emulsion films. Films obtained from the novel binders or from paints or pebble dash renderings containing these binders, in general exhibit a tendency to turn white which is reduced by at least 80%, ie. even after 100 hours' storage of the film in water at room temperature at most a slight haziness develops.

The aqueous emulsions of copolymer A can be prepared in the conventional manner by copolymerizing the monomers in aqueous emulsion in the presence of the conventional emulsifiers and dispersants; in most cases, the concentration of copolymer A in the emulsion is from 40 to 60% by weight. The emulsifiers and dispersants present are in most cases from 0.2 to 3% by weight, based on the amount of copolymer A, of anionic and/or non-ionic emulsifiers, eg. sodium dialkylsulfosuccinate, sodium salts of sulfated oils, sodium salts of alkylsulfonic acids, sodium, potassium and ammonium alkyl-sulfates, alkali metal salts of sulfonic acids, alkali metal salts of sulfated oxyalkylated $C_{12}$–$C_{24}$-fatty alcohols and of sulfated oxyalkylated alkylphenols, oxyethylated fatty acids, fatty alcohols and/or fatty amides, oxyethylated alkylphenols, and sodium salts of fatty acids, eg. sodium stearate and sodium oleate. The copolymers A have a glass transition temperature of 0°–50° C., preferably 15°–25° C., which is determined by conventional methods, for example by measuring the E-modulus in a creep test as a function of the temperature, or by means of differential thermal analysis (DTA). As "hard" comonomers (a), the copolymers (A) preferably contain methyl methacrylate or styrene, but copolymers which contain vinyl acetate, tert.-butyl acrylate and/or vinyl chloride as comonomers (a) are also very suitable. The content of acrylonitrile in general does not exceed 20% and is in most cases from 0 to 15, preferably from 5 to 10, % by weight. As comonomers (b), the copolymers A contain, as copolymerized units, vinyl propionate and/or esters of acrylic acid and/or methacrylic acid with alkanols of 2 to 8 carbon atoms, eg. ethanol, isopropanol, n-propanol, n-butanol, isobutanol or 2-ethylhexanol. Esters of acrylic acid with alkanols of 2 to 4 carbon atoms, especially ethyl acrylate, n-butyl acrylate and isobutyl acrylate, are of particular interest. The amounts of the comonomers (a) and (b) are selected so that the glass transition temperature of the copolymer A lies within the range stated above. As comonomers (c), the copolymer A contains, as copolymerized units, from 0.5 to 10%, preferably from 1 to 6%, of its weight, of monoolefinically unsaturated monocarboxylic acids and/or dicarboxylic acids of 3 to 5 carbon atoms, eg. acrylic acid, methacrylic acid and maleic acid, and/or their amides, eg. acrylamide and methacrylamide, and/or the N-alkyl and N-alkylol derivatives thereof, eg. N-methylacrylamide, N-isobutylacrylamide, N-methylmethacrylamide, N-methylolacrylamide, N-methylolmethacrylamide, N-ethoxymethylacrylamide, N-n-butoxymethylacrylamide or N-isopropoxymethacrylamide. The monoolefinically unsaturated dicarboxylic acids and their amides are of 4 or 5 carbon atoms, whilst amongst the alkylol derivatives the alkylolamides, especially the methylolamides, of monocarboxylic acids of 3 to 5 carbon atoms are preferred.

A characteristic feature of the copolymers A is that they contain from 0.5 to 10%, of their weight, of copolymerized monomers (d) possessing carbonyl groups. Monomers possessing carbonyl groups are, for the purposes of the invention, not, for example, esters, eg. ethyl acrylate or vinyl acetate, or amides, eg. acrylamide, or carboxylic acids, eg. acrylic acid, but monomers possessing at least one aldo group or keto group and one polymerizable double bond, ie., in particular, polymerizable monoolefinically unsaturated aldo compounds and keto compounds. Monomers (d) of particular interest are acrolein, diacetoneacrylamide, formylstyrene, vinyl alkyl ketones, preferably of 4 to 7 carbon atoms, in particular vinyl methyl ketone, vinyl ethyl ketone and vinyl isobutyl ketone, and/or acryloxyalkylpropanals and methacryloxy-alkylpropanals of the general formula (I)

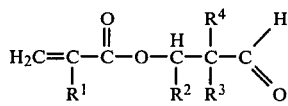

where $R^1$ is —H or —$CH_3$, $R^2$ is —H or alkyl of 1 to 3 carbon atoms, $R^3$ is alkyl of 1 to 3 carbon atoms and $R^4$ is alkyl of 1 to 4 carbon atoms. Such acryloxy-alkylpropanals and methacryloxy-alkylpropanals can be prepared, in accordance with the process of the earlier German Laid-Open Application DOS No. 2,722,097.9 by esterifying β-hydroxyalkylpropanals of the general formula (II)

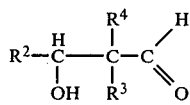

where $R^2$, $R^3$ and $R^4$ have the meanings given for the general formula (I), in the presence of an inert diluent and of small amounts of sulfonic acids and mineral acids at from 40° to 120° C., in particular from 60° to 90° C. Further suitable monomers (d) possessing keto groups are diacetone acrylate, acetonyl acrylate, diacetone methacrylate, 2-hydroxypropyl-acrylate acetylacetate and 1,4-butanediol acrylate acetylacetate. The amount of the copolymerized monomers (d) possessing carbonyl groups is preferably from 1 to 5% by weight, based on copolymer A.

The novel binders contain from 0.05 to 1, preferably from 0.4 to 0.6, mole of a water-soluble aliphatic dihydrazine compound per mole of carbonyl groups or keto groups present in the copolymer A. Suitable dihydrazine compounds B are in particular dihydrazides of aliphatic dicarboxylic acids of 2 to 10, especially of 4 to 6, carbon atoms, eg. oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide and/or itaconic acid dihydrazide. Water-soluble aliphatic dihydrazines of 2 to 4 carbon atoms, eg. ethylene-1,2-dihydrazine, propylene-1,3-dihydrazine and butylene-1,4-dihydrazine, are also suitable.

As component C the novel binders contain from 0 to 0.02, for example from 0.0002 to 0.01, mole of a water-soluble salt of the metals manganese, cobalt, lead and/or preferably zinc. Suitable water-soluble salts of these metals are especially the acetates and sulfates, and also the nitrates and nitrites; on the other hand, it is generally undesirable to use chlorides in the binders since they exhibit undesirable side effects in some cases. Specific examples of suitable salts are zinc sulfate, manganese-II sulfate, cobalt-II sulfate, the water-soluble acetates of zinc, manganese, cobalt and lead, lead nitrate, cobalt nitrate, manganese-II nitrate, zinc nitrite and lead nitrite. Amongst the water-soluble salts, the sulfates and acetates are generally preferred. The addition of component C is advantageous in certain cases, for example if impure dihydrazine compounds are employed.

Paints and pebble dash renderings can be produced from the novel binders by conventional methods. The binders can be used in an unpigmented form, if appropriate diluted with water, for example as primers. To prepare pigmented paints, the conventional pigments and pigment formulations can be employed, in the conventional amounts. Titanium dioxide (rutile), white lead, lithopone and colored pigment formulations are particularly suitable. Examples of fillers which can be used, in the conventional amounts, in the paints are chalk, calcite, talc and fine sand. Furthermore, the paints in most cases also contain ionic and/or non-ionic dispersants, for example low molecular weight polyacrylic acids or oxyethylated p-nonylphenol, thickeners, eg. cellulose ethers, styrene-maleic acid copolymers and/or polyvinylpyrrolidone, film-forming assistants, eg. glycol ethers, glycol ether acetates, pine oil or alcohols of 8 to 15 carbon atoms which possess from 1 to 3 OH groups and are liquid at room temperature, preservatives, eg. chloroacetamide or chlorophenols and/or flow control agents, eg. alkyl-polyethylene glycol ether bis-urethanes.

The novel binders can also be used, in the conventional amounts, as binders for pebble dash renderings. The latter in general contain from 5 to 12% of binder solids, the binder being based on copolymers with a mean film-forming temperature usually in excess of 15° C., together with thickeners, eg. cellulose ethers, salts of high molecular weight polyacrylic acids and/or polyvinylpyrrolidone, and film-forming assistants which bring the film-forming temperature to ≦5° C. The film-forming assistants used are esters of higher fatty acids, eg. diisopropyl adipate, gasolines containing aromatics, glycol ethers, glycol ether acetates and mixtures of these.

DETERMINATION OF THE DRY ADHESION AND WET ADHESION OF PAINT FILMS ON GLOSSY ALKYD RESIN PRIMERS 1 mm thick aluminum sheets are roughened to a depth of about 20μ by means of a sander. A 32 cm long and 6 cm wide stripe of a commercial alkyd resin coating is applied to these roughened sheets by means of a knife coater (set to a 120μ gap). The sheets are kept for 24 hours at 23° C. and 50% relative atmospheric humidity and then for 5 days at 45° C. in a through-circulation dryer. After further storage of from 3 to 10 days at 23° C. and 50% relative atmospheric humidity, the polymer emulsion or paint to be tested is applied to the alkyd resin surfaces by means of a 4 cm wide knife coater set to 250μ. A 6 cm wide, uncreased strip of a cotton fabric (calico) is embedded under light pressure in the coating while the latter is still wet, and further emulsion or paint is immediately applied by moving the 250μ knife coater to and fro 3 times. The specimen is then dried for from 3 to 4 days when testing a polymer emulsion or from 1 to 4 weeks when testing a paint, after which the edges of the test strip are cut off, giving a strip 3.5 cm wide.

The test strips are then half immersed in fully demineralized water for 2 hours. Thereafter, the cotton fabric is pulled off at a rate of 3 m/min by means of the roll peel device described in DIN No. 53,289. Whilst it is being pulled off, the peel strength is measured, with the aid of the tensometer, both in the dry and in the soaked part of the test strip, and the rupture pattern is observed. The peel strength in related to the width of the sample in the conventional manner.

In the Examples which follow, parts and percentages are by weight.

EXAMPLE 1

The following are introduced into a reaction vessel equipped with a thermostat, anchor stirrer, reflux condenser, feed vessels, thermometer and nitrogen inlet: 1,050 parts of water, 13.5 parts of a 35% strength aqueous solution of the sodium salt of a sulfuric acid half-ester of an adduct of p-nonylphenol with 20 moles of ethylene oxide (anionic emulsifier) and 45 parts of a 20% strength solution of an adduct of p-nonylphenol with 25 moles of ethylene oxide (non-ionic emulsifier).

Feed I is a mixture of 504 parts of water, 66 parts of a 35% strength solution of the above anionic emulsifier, 880 parts of methyl methacrylate, 850 parts of n-butyl acrylate, 95 parts of acrolein, 20 parts of acrylic acid and 30 parts of acrylamide.

A solution of 7.5 parts of potassium persulfate in 180 parts of water is prepared in feed vessel II.

The reactor is thoroughly flushed with nitrogen. 10% of feed I are then added to the initial charge and the mixture is heated to 90° C. 10% of feed II are added in one shot to the reactor, and thereafter feeds I and II are run into the reactor uniformly and simultaneously in the course of 3 and 3.5 hours respectively. When all has been added, the mixture is maintained at 90° C. for a further 1½ hours, the reactor is then cooled to room temperature, the pH of the emulsion is brought to 7–8 with aqueous ammonia, 35 parts of adipic acid dihydrazide and 20 parts of a 1% strength aqueous zinc sulfate solution are added and the mixture is stirred for about an hour.

A fine emulsion having an LT (light transmission) value (water=100%) of 90% and a solids content of 48% is obtained; a film produced from the emulsion has an adhesion of 2 kp/3.5 cm in the roll peel test and even after 1 week's storage in water shows only slight clouding but no whitening.

COMPARATIVE EXPERIMENTS (a) The procedure described above is followed, but omitting the adipic acid dihydrazide. The wet adhesion of a film of the emulsion, when determined by the roll peel test, is only <0.2 kp/3.5 cm. An 0.5 mm thick film has turned opaque white after 1 week's storage in water at room temperature.

(b) The procedure described in Example 1 is followed, but no acrolein is added when carrying out the polymerization. The wet adhesion of a film of the emulsion is again <0.2 kp/3.5 cm. An 0.5 mm thick film has turned opaque white after 1 week's storage in water at room temperature.

EXAMPLE 2

The procedure described in Example 1 is followed, but using 1050 parts of water and 18 parts of the emulsion from Example 1 as the initial charge.

Instead of the emulsion feed I, separate feeds are used, namely

Ia: 880 parts of methyl methacrylate, 850 parts of n-butyl acrylate and 95 parts of acrolein, and Ib: 504 parts of water, 20 parts of acrylic acid and 30 parts of acrylamide.

In other respects the procedure described in Example 1 is followed, the feeds Ia and Ib being run into the reactor uniformly and simultaneously.

The pH of the resulting emulsion is brought to 7–8 with aqueous ammonia and 35 parts of glutaric acid dihydrazide and 20 parts of a 1% strength aqueous cobalt sulfate solution are then added. A coarse emulsion (LT value≃25%) is obtained; the wet adhesion of a film, in the roll peel test, is 1 kp/3.5 cm. Films produced from the emulsion show a reduced tendency to turn white.

EXAMPLE 3

The procedure described in Example 1 is followed, but the following mixture is used as feed I over the first 1½ hours: 252 parts of water, 33 parts of a 35% strength solution of the anionic emulsifier described in Example 1, 15 parts of acrylamide, 10 parts of acrylic acid, 430 parts of methyl methacrylate, 420 parts of n-butyl acrylate and 130 parts of acrolein, whilst feed II, used over the second 1½ hours, is a mixture of: 252 parts of water, 33 parts of a 35% strength solution of the anionic emulsifier described in Example 1, 15 parts of acrylamide, 10 parts of acrylic acid, 430 parts of methyl methacrylate and 420 parts of n-butyl acrylate.

The pH of the emulsion is brought to 7–8 by means of aqueous ammonia, and 35 parts of succinic acid dihydrazide and 20 parts of a 1% strength aqueous manganese sulfate solution are added. A fine emulsion (LT value≃90%) is obtained, which gives a film having a wet adhesion, in the roll peel test, of more than 2 kp/3.5 cm. Films produced from the emulsion show a reduced tendency to turn white.

EXAMPLE 4

350 parts of water are introduced into the reactor. The procedure described in Example 1 is followed, using, as feed I, a mixture of 230 parts of water, 20 parts of a 35% strength solution of the anionic emulsifier described in Example 1, 10 parts of a 40% strength solution of a sodium $C_{14}$–$C_{16}$-alkylsulfonate, 375 parts of methyl methacrylate, 325 parts of 2-ethylhexyl acrylate and 50 parts of acryloyloxypivalaldehyde, and, as feed II, a solution of 5.6 parts of potassium persulfate in 180 parts of water.

The reactor is flushed with nitrogen, the initial charge together with 5% of feed I is heated to 85° C., and 5% of feed II are then added in one shot. After 15 minutes, the addition of the remainders of feeds I and II is started, these being introduced into the reactor uniformly and simultaneously over 2 hours. When all has been added, the mixture is kept at 85° C. for 1 hour and is then cooled to room temperature, the pH is brought to 7–8 with aqueous ammonia, 15 parts of the dihydrazide of a technical dicarboxylic acid mixture (consisting essentially of succinic acid, glutaric acid and adipic acid) and 10 parts of a 1% strength aqueous zinc sulfate solution are added and stirring is continued for 1 hour.

A fine emulsion (LT value≃80%) of about 48% strength is obtained, which gives films which in the roll peel test have a wet adhesion of about 0.8 kp/3.5 cm. Films of the emulsion show a reduced tendency to turn white.

EXAMPLE 5

A mixture of 700 parts of water and 1.5 parts of a freshly prepared 1% strength aqueous iron-II sulfate solution is introduced into a reactor.

Feed I is a mixture of 365 parts of water, 25 parts of a 35% strength solution of the anionic emulsifier described in Example 1, 15 parts of a 40% strength solution of a sodium $C_{14}$–$C_{16}$-alkylsulfonate, 650 parts of methyl methacrylate, 750 parts of i-butyl acrylate and 75 parts of diacetoneacrylamide, whilst feed II is a solution of 11.5 parts of potassium persulfate in 365 parts of water, and feed III is a mixture of 100 parts of water, 15 parts of a 35% strength aqueous solution of the anionic emulsifier described in Example 1, 7.5 parts of a 40% strength solution of a sodium $C_{14}$–$C_{16}$-alkylsulfonate and 2 parts of sodium sulfoxylate.

The initial charge is flushed with nitrogen and heated to 45° C. 5% of each of feeds I and II are then added and the polymerization is started by adding 5% of feed III in one shot. 15 minutes later, the uniform addition of feeds I, II and III to the reactor, over 2, 2¼ and 2½ hours respectively, is started, the internal temperature being kept at about 50° C. When all of feed I has been added, the temperature is raised to 85° C. and kept at this level for 1½ hours. The mixture is then cooled to room temperature, the pH of the emulsion is brought to 7–8 with aqueous ammonia, and 30 parts of adipic acid dihydrazide and 20 parts of a 1% strength aqueous zinc sulfate solution are stirred into the batch.

The fine emulsion (LT value≃85%), having a solids content of 46%, gives films which in the roll peel test have a wet adhesion of more than 1.5 kp/3.5 cm. Films of the emulsion show a reduced tendency to turn white.

EXAMPLE 6

The procedure described in Example 5 is followed, but acetonyl acrylate is used instead of diacetoneacrylamide, and 40 parts of a compound of the general formula

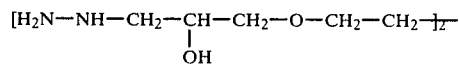

are used instead of the adipic acid dihydrazide. A fine emulsion (LT value≃86%) is obtained, which has a solids content of 47% and gives films which exhibit a wet adhesion, in the roll peel test, of ~0.5 kp/3.5 cm, and a reduced tendency to turn white.

EXAMPLE 7

The procedure described in Example 5 is followed, but feed I contains 45 parts of formylstyrene instead of the diacetone-acrylamide, 765 parts (instead of 650 parts) of methyl methacrylate and 667 parts of 2-ethylhexyl acrylate instead of the i-butyl acrylate. Instead of the dicarboxylic acid dihydrazide, 40 parts of a compound of the general formula

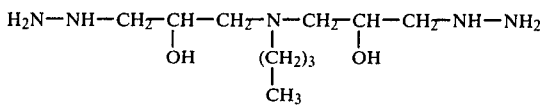

are used.

The resulting fine emulsion has a solids content of 46% and gives films which exhibit a wet adhesion, in the roll peel test, of about 2 kp/3.5 cm, and a reduced tendency to turn white.

EXAMPLE 8

420 parts of water, 2.5 parts of a 35% strength solution of the anionic emulsifier described in Example 1, 30 parts of a 20% strength solution of the non-ionic emulsifier described in Example 1 and 75 parts of a 10% strength aqueous solution of the reaction product of a $C_{16}$–$C_{18}$-fatty alcohol mixture with 10 moles of ethylene oxide are introduced into the reactor.

Feed I is a mixture of 820 parts of water, 22.5 parts of a 35% strength solution of the anionic emulsifier described in Example 1, 62 parts of a 20% strength solution of the non-ionic emulsifier described in Example 1, 115 parts of a 10% strength solution of the above oxyethylated fatty alcohol, 112 parts of a 10% strength solution of an about 88% hydrolyzed polyvinyl acetate, 15 parts of sodium vinylsulfonate, 675 parts of styrene, 750 parts of n-butyl acrylate, 15 parts of methacrylic acid, 15 parts of methacrylamide, and 75 parts of diacetone-acrylamide.

Feed II is a solution of 11 parts of potassium persulfate in 330 parts of water.

The reactor is flushed with nitrogen, the initial charge is heated to 90° C., 10% of feed I are added followed by 10% of feed II in one shot, and after 15 minutes the remainder of feed I is run in over 3 hours and the remainder of feed II over 3½ hours. The polymerization temperature is maintained at 90° C. for a further 1½ hours, the emulsion is then cooled to room temperature, the pH of the emulsion is brought to 7–8 with aqueous ammonia, and 35 parts of adipic acid dihydrazide and 20 parts of a 1% strength aqueous zinc sulfate solution are added whilst stirring. An emulsion having a broad particle size distribution and a solids content of 44% is obtained; the emulsion gives films which in the roll peel test have a wet adhesion of about 1.2 kp/3.5 cm and exhibit a reduced tendency to turn white.

EXAMPLE 9

Preparation of a satin finish paint

The following are mixed in the stated sequence: 31 parts of water, 3 parts of a preservative (chloroacetamide), 2 parts of 25% strength ammonia, 3 parts of a commercial silicone-based anti-foam agent, 8 parts of a dispersant based on a low molecular weight polyacrylic acid, 56 parts of a thickener (for example a 15% strength aqueous solution of a vinyl methyl ether/-maleic acid half-ester copolymer), 47 parts of propylene glycol, 19 parts of butylglycol, 252 parts of titanium dioxide (rutile) and 359 parts of a polymer emulsion prepared as described in Example 5.

The resulting satin-finish paint gives particularly water-resistant paint films.

EXAMPLE 10

Preparation of a pebble dash rendering

The following are mixed in the stated sequence: 191 parts of a polymer emulsion prepared as described in Example 5, 38 parts of a 2% strength solution of a cellulose ether having a viscosity of from 4,000 to 6,000 mPa.s, 8 parts of an isobutyric acid ester of a higher alcohol, 1 part of a preservative (chloroacetamide) and 762 parts of stone chips.

This composition gives renderings which show virtually no whitening.

We claim:

1. A binder for paints and pebble dash renderings, which comprises
   (A) an aqueous emulsion, of from 20 to 70% strength, of a copolymer A, having a glass transition temperature of 0°–50° C., of
      (a) a monomer from the group comprising methyl methacrylate, styrene, vinyl acetate, tert.-butyl acrylate and vinyl chloride, with or without acrylonitrile and
      (b) a monomer from the group comprising alkyl methacrylates, where alkyl is of 2 to 8 carbon atoms, alkyl acrylates, where alkyl is of 2 to 8 carbon atoms, and/or vinyl propionate, which additionally contains, as copolymerized units,
      (c) from 0.5 to 10%, of its weight, of a monomer from the group comprising monoolefinically unsaturated monocarboxylic acids of 3 to 5 carbon atoms, monoolefinically unsaturated dicarboxylic acids of 4 or 5 carbon atoms, amides of monoolefinically unsaturated monocarboxylic acids of 3 to 5 carbon atoms, amides of monoolefinically unsaturated dicarboxylic acids of 4 or 5 carbon atoms and N-alkylolamides of monocarboxylic acids of 3 to 5 carbon atoms and
      (d) from 0.5 to 10%, of its weight, of monomers containing carbonyl groups,
   (B) from 0.05 to 1 mole, per mole of carbonyl groups present in the copolymer A, of a water-soluble aliphatic dihydrazine compound and
   (C) from 0.0002 to 0.02 mole, per mole of dihydrazine compound, of a water-soluble salt of a metal from the group comprising zinc, manganese, cobalt and lead.

2. The binder of claim 1, wherein component (C) consists of from 0.0002 to 0.01 mole of a sulfate or acetate of the metal per mole of dihydrazine compound.

3. The binder of claim 1, wherein the copolymer A contains, as copolymerized units, from 1 to 5%, of its weight, of polymerizable monoolefinically unsaturated aldehyde and/or keto compounds.

4. The binder of claim 1, wherein the water-soluble salt is selected from the group consisting of zinc sulfate, manganese-II sulfate, cobalt-II sulfate, the water-soluble acetates of zinc, manganese, cobalt and lead, lead nitrate, cobalt nitrate, manganese-II nitrate, zinc nitrite and lead nitrite.

5. The binder of claim 2 wherein the metal is zinc.

* * * * *